US012375846B1

(12) United States Patent
Mathur

(10) Patent No.: US 12,375,846 B1
(45) Date of Patent: Jul. 29, 2025

(54) LOUDSPEAKER SYSTEM HAVING AN ACOUSTIC META MATERIAL ENCLOSURE

(71) Applicant: Gopal Prasad Mathur, Trabuco Canyon, CA (US)

(72) Inventor: Gopal Prasad Mathur, Trabuco Canyon, CA (US)

(73) Assignee: Acoustic Metamaterials LLC, Scarsdale, NY (US)

( * ) Notice: Subject to any disclaimer, the term of this patent is extended or adjusted under 35 U.S.C. 154(b) by 0 days.

(21) Appl. No.: 19/200,926

(22) Filed: May 7, 2025

(51) Int. Cl.
*H04R 1/28* (2006.01)
*H04R 1/02* (2006.01)
*H04R 29/00* (2006.01)

(52) U.S. Cl.
CPC ........... *H04R 1/2873* (2013.01); *H04R 1/025* (2013.01); *H04R 1/2803* (2013.01); *H04R 1/2811* (2013.01); *H04R 1/2815* (2013.01); *H04R 1/2823* (2013.01); *H04R 29/001* (2013.01); *H04R 2201/029* (2013.01); *H04R 2499/11* (2013.01)

(58) Field of Classification Search
CPC .... H04R 1/025; H04R 1/2803; H04R 1/2811; H04R 1/2815; H04R 1/2823; H04R 1/2873; H04R 29/001; H04R 2201/029; H04R 2499/11
See application file for complete search history.

(56) References Cited

U.S. PATENT DOCUMENTS 7,957,541 B2 * 6/2011 Edgren ................. H04M 1/035 381/89
9,894,429 B2 * 2/2018 Risberg .................. H04R 1/345
10,950,212 B1 * 3/2021 Mathur .................. H04R 1/028

* cited by examiner

*Primary Examiner* — Huyen D Le
(74) *Attorney, Agent, or Firm* — Michael J. Feigin, Esq.; Feigin and Fridman LLC

(57) ABSTRACT

A method for designing and making an acoustic meta material back enclosure with a band gap tube for a loudspeaker having predefined dimensions of the enclosure is described. The method includes identifying a resonant frequency of the enclosure, as well as a baseline speaker output within a predefined range of frequencies. The method further includes defining a desired frequency range, within the predefined range of frequencies, within which it is desired to increase the speaker output, and identifying a naturally occurring band gap frequency range for the enclosure. Parameters of an acoustic meta material (AMM) band-gap tube, to be inserted into the enclosure for porting thereof, are calibrated to improve speaker output in the desired frequency range, based on the identified band gap frequency range. The enclosure is then ported using AMM band-gap tube in accordance with the calibrated parameters.

14 Claims, 5 Drawing Sheets

LOUDSPEAKER SYSTEM HAVING AN ACOUSTIC META MATERIAL ENCLOSURE

FIELD OF THE DISCLOSED TECHNOLOGY

The present disclosure relates generally to amplifying sound radiation from a loudspeaker, and more specifically to methods for designing and making a back enclosure of a loudspeaker, using acoustic meta material (AMM) methods, to redistribute the acoustic energy emanating from the loudspeaker.

BACKGROUND OF THE DISCLOSED TECHNOLOGY

Loudspeakers are integral/critical parts of all audio systems. Loudspeakers convert electrical energy into mechanical energy, which in turn is converted into acoustic energy.

Many loudspeakers have an enclosure on the backside of the speaker, for example as seen in FIG. 1B (PRIOR ART). In such cases, the performance of the loudspeaker is impacted by the acoustics within the enclosure. Often, the main objective of an enclosure is to separate sound waves generated on the front side of the speaker from the ones generated on the backside. The sound waves generated on the front and back sides of the speaker are out of phase, and as such, they will cancel each other out when they meet or are allowed to merge, which would happen in a loudspeaker without a baffle or enclosure. Thus, all loudspeakers require some form of isolation of sound energy that radiates off the speaker backside. Baffles, or some other sort of enclosure, as shown in FIG. 1(A-B) (PRIOR ART), are required to maintain and define a low frequency output. Enclosures, which have become an integral part of most loudspeakers, are a specific way to implement an infinite baffle on a loudspeaker.

Sounds emitted by the speaker at the front and back thereof are phase shifted by exactly at 180 degree, and are thus opposite to one another. If the enclosure is not used to isolate the backward radiated sound, the backward radiated sound will cancel sound at the front by destructive interference. That will reduce speaker output greatly.

A loudspeaker enclosure can be thought of as a baffle wrapped around a loudspeaker on the backside. Thus, the loudspeaker enclosure contains all the back radiation, which would have otherwise radiated away, as well its own modal characteristics. The enclosure will apparently influence loudspeaker's front radiation.

However, all types of baffles and enclosures will not work equally well with all speakers. Because of the large air spring present in an infinite baffle enclosure, in such enclosures extreme cone travel will occur and allow the $X_{max}$ level to be easily exceeded. This uncontrolled cone excursion can cause increased audible distortion and risk mechanical damage to the speaker. Reducing system power will control the excursion but at the cost of reduced system output or SPL.

Two types of enclosures are commonly used, acoustic suspension enclosures—also called closed baffles, and bass reflex or vented enclosure enclosures, as shown in FIGS. 1B (PRIOR ART) and 1C (PRIOR ART), respectively.

Closed baffles and acoustic suspension enclosures use the air sealed into the enclosure as an air spring, adding to the speaker's air resonance, in order to define the low frequency output of the system. Compliance of the enclosed air in an acoustic suspension system is typically 30% or less of the compliance of the speaker. Speakers are specifically designed for sealed enclosure applications by balancing suspension stiffness with moving mass and magnet motor strength.

Since a loudspeaker diaphragm radiates on both sides, front and back, it creates acoustic pressure on its back within the enclosure. Below the resonance frequency of the enclosure, acoustic pressure changes from positive to strongly negative, which causes sudden drop in performance of the loudspeaker. Build-up of negative pressure in the enclosure causes negative axial forces on the diaphragm, which in turn causes the diaphragm to stiffen and this does not allow the diaphragm to efficiently radiate sound waves on the front side. This phenomenon is due to the pressure build-up around the resonance peak in the back enclosure and exists all the way down to the lowest frequency. Thus, performance of the loudspeaker below the enclosure resonance frequency is essentially controlled by pressure build-up in the back enclosure along with damped nature of the diaphragm.

Additionally, although placing a loudspeaker in a closed box prevents the back-to-front cancelation effect, it suffers from a shift in the output curve upward in frequency compared to the infinite baffle. A bass reflex enclosure can extend the bass response significantly below the loudspeaker resonance, $f_o$.

Bass reflex enclosures (shown in FIG. 1C), also called vented box enclosures, are used when amplified output at low frequency is required. A port, also known as a vent, is added to an otherwise sealed enclosure and the port's internal diameter and length together create a conventional Helmholtz resonance that reinforces the systems' low frequency output. As with other enclosure types, speakers are specifically designed for bass reflex applications. A Bass-Reflex enclosure typically utilizes Helmholtz resonance to extend the low-frequency response of a speaker system. When examining the electrical input impedance of such a system it typically features two peaks and minimum impedance in between.

Nearly all-modern professional loudspeaker enclosures, designed to improve the low frequency response, are vented or ported. The majority of low frequency sound reproduction is from vented/ported loudspeaker enclosures—that is, loudspeakers that have a port in the enclosure. Perhaps the most important assumption about vented boxes is that the air moving in the port behaves the same way independent of the enclosure output SPL (Sound Pressure Level). Unfortunately, this assumption is easily violated. Designs that appear to function well at low output levels may behave poorly when required to produce the extreme output levels commonplace in professional audio.

A Helmholtz resonator or Helmholtz oscillator is a container of gas (usually air) with an open hole (e.g., neck or port). At the Helmholtz resonance, a volume of air in and near the open hole vibrates because of the 'springiness' of the air inside. The Helmholtz principle is used in the loudspeaker cabinet designs when the bass reflex effect is to be exploited. In this case a phase inversion of the source pressure wave (the vibrating speaker diaphragm) occurs at the Helmholtz resonance, allowing for a constructive interference outside the cavity, resulting in a +3 dB improvement given by the cabinets with bass reflex. However, this phenomenon can occur only at frequencies higher than the Helmholtz resonance frequency. As such, the Helmholtz resonance frequency should be very low (for example 10 Hz) in order to allow for a constructive interference within the frequency range of interest (for example 20-200 Hz).

A Helmholtz resonator has a single isolated resonant frequency and no other resonances below about 10 times that frequency. The resonant frequency (f) of a classical Helmholtz resonator, is determined by its volume (V) and by the length (L) and cross-sectional area (A) of its neck:

$$f = \left(\frac{c}{2\pi}\right)\sqrt{\frac{A}{LV}},$$

where, c is the speed of sound in air. The value of the length of the neck should be given as the effective length, which depends on its radius of the vent.

Looking at the Helmholtz resonator from the outside, at a frequency f, the mass m (the air in the neck of the resonator), which is supported on the spring (the enclosed air) with spring constant k, whose other end is fixed (the air in the resonator can't escape) is being pushed with an oscillatory force F. Gravitational and frictional forces are neglected for now.

Acoustically, at sufficiently low frequency, it looks like an acoustic compliance: the mass of air is pushed back in the neck and compresses the air in the resonator. The applied force F is in phase with x measured to the right, so it is 90° behind the velocity and the applied pressure is 90° behind the acoustic flow into the resonator. Remember that $f^2$ dependence of the acceleration. So, at sufficiently high frequency, the spring force is negligible in comparison with that accelerating the mass. Since F is in phase with the acceleration, which puts it 90° ahead of the velocity. Acoustically, the applied pressure is 90° ahead of the acoustic flow into the resonator. It is a mechanical or acoustic inertance. This inertance of the Helmholtz resonator is used in passive impedance matching of the back enclosure with the outside air to augment sound radiation from loudspeaker at low frequencies.

Even though narrow-frequency band systems, such as conventional Helmholtz resonators, can be meaningful in some special occasions, most practical applications still require broadband noise absorption or amplification characteristics.

In vented or ported enclosures, the rear sound radiation is utilized to boost the bass response below the loudspeaker driver's resonant frequency. The combination of the enclosure volume and the vent length and diameter form a Helmholtz resonator, which, when properly implemented, reinforces the low frequency response without creating excessive bass and/or poor transient response.

If the Helmholtz resonance frequency is correctly coordinated with the electro-mechano-acoustical resonance frequencies and "Q's" (quality factors) of the driver, predictable results can be obtained in the finished product. Detailed technical analyses for coordination of the Helmholtz resonance frequency with the electro-mechano-acoustical resonance are known in the art.

Vented enclosures can be more efficient. This is because the vent or port uses the energy created by the vibrating woofer speaker and translates it into a resonating plug of air producing the lower frequencies much more efficiently. The vent or port limits the amount that the woofer needs to vibrate. The woofer is less efficient at producing bass, because at low frequencies its motion is both electrically and mechanically damped. The port starts producing some of the sound from around an octave above tuning, and by the tuning frequency all of the bass is produced by the port or vent, with nothing being produced by the woofer directly. The woofer's travel at this point is minimized and is close to zero. This increases the power handling and output making it a very efficient way of generating bass and reduced driver distortion if properly tuned. The port stops producing bass output at about ⅓ of an octave below tuning. Below the resonance frequency of the enclosure, the response of a loudspeaker in a vented enclosure degrades rapidly with a steep roll-off of 24 dB per octave. The vent, if not designed correctly or at high sound levels, can get noisy, as the air escapes the port. Transient response is not as good as that of a sealed equivalent. Vented/Ported enclosures rely on the Helmholtz Resonator principle to work.

The port and the enclosure work like a Helmholtz resonator, and back waves reverse phase and come out the port in phase with the front waves. For this reason, not only do the back waves do not cancel the front waves, they reinforce the front waves and increase the efficiency by about 3 dB. This effect only happens when reaching the resonance frequency of the port. Above this point (higher frequencies), the mass of air inside the port is too great to respond to the speaker movement, and it acts like a perfectly sealed enclosure. Below this point, the port acts just like a hole in a sealed box. The back waves do not reverse phase and come out of the port, only to cancel the front waves. This is the reason for the steep roll-off (24 dB/octave) of a bass reflex speaker below the resonance frequency point.

In a vented enclosure, the acoustic characteristics (e.g., amplitude, phase, etc.) inside the enclosure are changed by the Helmholtz resonator effect due to the presence of a vent tube. The back energy, that would otherwise be contained in the back enclosure and generally lost, is reversed and added to the energy of the front loudspeaker diaphragm. The reversal process delays the energy by one cycle or more, but makes the design more sensitive, because the two waves (front and back) are added together. Additionally, below the resonance frequency, strong negative pressure suddenly builds up (due to the phase reversal) and the loudspeaker efficiency drastically drops below that of a loudspeaker in an infinite baffle.

However, there remains a need in the art for methods and systems which manage acoustics of the enclosure to improve loudspeaker efficiency using porting and passive methods.

SUMMARY OF THE DISCLOSED TECHNOLOGY

In accordance with an embodiment of the disclosed technology, there is provided an acoustics management system, including a loudspeaker having a front side and a back side connected by side walls, the front side facing in a first direction, The acoustics management system further includes an enclosure surrounding a portion of said first loudspeaker, such that said enclosure is open about said front side of said first loudspeaker and is closed about said side walls and said back side of said loudspeaker. An acoustic meta material (AMM) band-gap tube is disposed within a back wall or a side wall of the enclosure and forms a port therein. The AMM band-gap tube enables output of waveforms from the backside of the loudspeaker out of the enclosure, thereby to augment at least some waveforms emanating from the front side of the loudspeaker.

In some embodiments, a length, a diameter, and a position of the AMM band-gap tube are calibrated based on a band-gap frequency of the enclosure.

In some embodiments, the waveforms output from the backside of the loudspeaker and the waveforms emanating from the front side of the loudspeaker are sound waveforms.

In some embodiments, the waveforms output from the backside of the loudspeaker and the waveforms emanating from the front side of the loudspeaker are pressure waveforms.

In some embodiments, the AMM band-gap tube is disposed in the back wall of the enclosure.

In some embodiments, the AMM band-gap tube is disposed in the sidewall of the enclosure.

In some embodiments, a length of the AMM band-gap tube is greater than a diameter thereof.

In some embodiments, a diameter of the AMM band-gap tube is greater than a length thereof.

In accordance with an embodiment of the disclosed technology, there is provided a method for calibrating a frequency range of a loudspeaker disposed within an enclosure having predefined dimensions. The method includes identifying a resonant frequency of the enclosure, as well as a baseline speaker output within a predefined range of frequencies. The method further includes defining a desired frequency range, within the predefined range of frequencies, within which it is desired to increase the speaker output, and identifying a naturally occurring band gap frequency range for the enclosure. Parameters of an acoustic meta material (AMM) band-gap tube, to be inserted into the enclosure for porting thereof, are calibrated to improve speaker output in the desired frequency range, based on the identified band gap frequency range. The enclosure is then ported using AMM band-gap tube in accordance with the calibrated parameters.

In some embodiments, the desired frequency range is below the resonance frequency of the enclosure.

In some embodiments, the porting of the enclosure is configured to increase the speaker output within the desired frequency range without changing the dimensions of the enclosure.

In some embodiments, the identifying of the natural band gap frequency includes searching for the natural band gap frequency at frequencies lower than the resonance frequency.

In some embodiments, the calibrating of the parameters includes calibrating a designated location of the AMM band gap tube within the enclosure.

In some embodiments, the calibrating of the parameters includes calibrating a length of the AMM band-gap tube.

In some embodiments, the calibrating of the parameters includes calibrating a diameter of the AMM band-gap tube.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

Figure 1A:
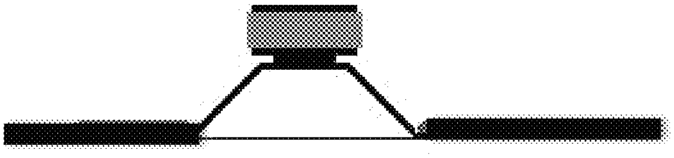
Figure 1A (Prior Art)
FIG. 1A is a graphic representations of embodiments prior art loudspeakers.

The disclosed technology relates to an acoustic meta material (AMM), broadband system for passive management of acoustics in the loudspeaker back enclosure, in order to improve loudspeaker performance. Specifically, the disclosed technology relates to use of AMM techniques to include passive acoustic elements in the enclosure, thereby to provide impedance matching of back enclosure with the front of the loudspeaker over a much wider frequency range than provided by the conventional ported enclosure systems. The AMM back enclosure is applicable mainly in the lower frequency range, and is effective over a much wider frequency range than the traditional Helmholtz vented enclosure system based on the conventional Helmholtz resonator.

For purposes of this disclosure, a "loudspeaker" is defined as an electro-acoustic transducer, which converts an electrical signal into audio output.

The disclosed technology makes use of acoustic meta materials (AMMs), which are artificial materials with anomalous effective properties that can manipulate acoustic waves. Passive AMMs generally do not provide external energy input into acoustic waves. Acoustic meta-surfaces with Helmholtz resonators can generate a desired phase shift gradient through the tailoring of resonator structures. The resulting meta-surface can have superior properties, such as broad bandwidth, high transmission coefficient, well-matched acoustic impedance, and ease of fabrication.

The development of AMM is based on the phononic crystals due to the similarity between acoustic waves and electromagnetic waves. The latter has been widely used in cloaking devices, microwave communications, etc. In analogy to phononic crystal, AMM is often termed as "locally resonant phononic crystal", where "locally resonant" is added in order to distinguish it from the Bragg Scattering phononic crystal. Locally resonant phononic crystal has a periodic diatomic microstructure.

The term "phononic crystals" refers to a class of materials with special acoustic properties. Phononic crystals have many properties, such as defect states, negative refraction and sound focusing, and directional propagation of elastic waves. One typical characteristic of phononic crystals is regulating the band structure of elastic waves, thus obtaining special properties in spectral space, wave vector space and phase space.

Phononic crystals make use of the fundamental properties of waves, such as scattering and interference, to create "band gaps"-ranges of wave-length or frequency within which waves cannot propagate through the structure. This phenomenon is well known in physics: the electrons in a semiconductor can only occupy certain energy bands, while phononic crystals only allow light in certain frequency ranges to travel through them.

The band gap in a phononic crystal is caused by a periodic variation in the refractive index of an artificially structured material. In a phononic crystal the density and/or elastic constants of the structure change periodically. This changes the speed of sound in the crystal, which, in turn, leads to the formation of a phononic band gap. Band gaps appearing in the wave propagation in periodic media are often termed "Bragg band gaps" as their origin is closely related to Bragg diffraction.

The most important property is the "band gap" characteristic of sound waves, wherein sound waves within the frequency range of the band gap will be suppressed and will not propagate in the structure, while sound waves outside the frequency range will propagate normally, without being affected. There are two main mechanisms for the generation of a band gap: Bragg scattering and local resonance.

With local resonance, the band gap is due to the resonance with the resonator when a frequency of the sound wave coincides with its Eigen mode frequency. The resonance then blocks the forward transmission of the sound wave.

Bragg band gap is mainly controlled by Bragg conditions. In order to meet the reflection and stacking effect of elastic waves in periodic structure, its lattice size should be larger than half of the wavelength of elastic waves. Therefore, in order to obtain low-frequency Bragg band gap, the size of the phononic crystal is often too large for practical application.

However, locally resonant phononic crystals break through the limitations of Bragg scattering phononic crystals and show obvious advantages in a low-frequency region, showing negative equivalent modulus and negative equivalent mass density which are different from traditional materials. Helmholtz resonator presents a simple locally resonant phononic crystal structure.

Band gap phenomenon is of interest due to the out-of-phase motion of the introduced local resonators when vibrations and/or motions occur near resonance. Vibrations of the main structure within the frequency range around the resonant frequency of the local resonator are absorbed and attenuated. The frequency range within which vibrations are attenuated is termed band gap. Different from the Bragg Scattering phononic crystal, the locally resonant phononic crystal generates band gaps irrelevant to the periodic constant as the mechanism of its band gap generation is similar to that of vibration absorbers and/or acoustic resonators, such as a Helmholtz resonator.

The locally resonant structures, such as Helmholtz resonators, possess negative effective bulk modulus and negative dynamic mass density in its band gap. The effective frequency-dependent mass density of the acoustic meta material could be negative near resonance, which corresponded to the band gap. It has been reported that an ultrasonic phononic crystal consisted of an array of sub-wavelength Helmholtz resonators have an effective negative dynamic modulus near the resonance frequency, which shows that this crystal can be used as an acoustic meta material. However, a single Helmholtz resonator typically has a frequency response centered around its resonant frequency.

The disclosed technology relates to an AMM Helmholtz resonator system that creates phononic band gaps. The disclosed system includes a neck or port with a required compliant volume, to achieve broad bandwidth and associated phase reversals. AMM phononic resonators according to the disclosed technology can yield higher amplification over a much broader frequency range. The band gaps created in the system of the disclosed technology are particularly useful in noise control applications as well. As explained in further detail herein, a Helmholtz resonator can be calibrated to one or more specific target frequencies, by adjusting structural parameters thereof.

Double Helmholtz resonator can produce multiple band gaps, due to the resonance of the inner and outer cavities of the resonator. These band gaps can localize sound waves and prevent them from propagating. While the disclosure herein relates to a single Helmholtz resonator, similar systems and methods can be used for creating a double Helmholtz resonator making use of the multiple band gaps to distribute the energy at the lower frequencies, as explained in further detail herein.

Figure 2A:
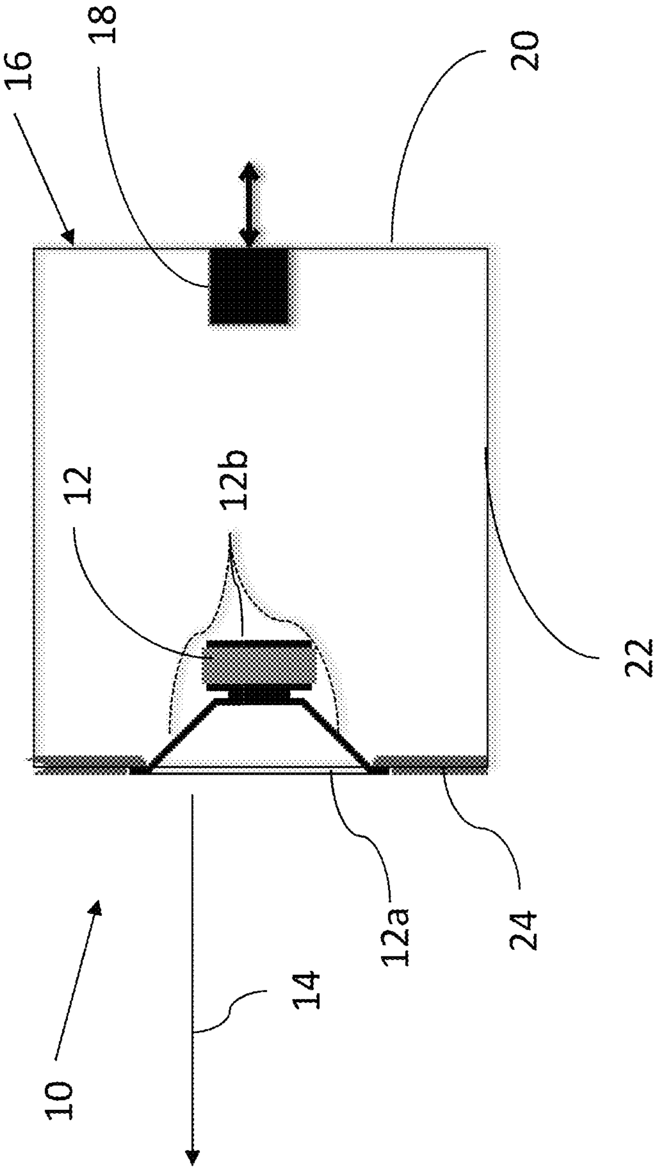
FIG. 2A is a first schematic sectional illustrations of an acoustic metamaterial ported enclosure according to embodiments of the disclosed technology.
Figure 2B:
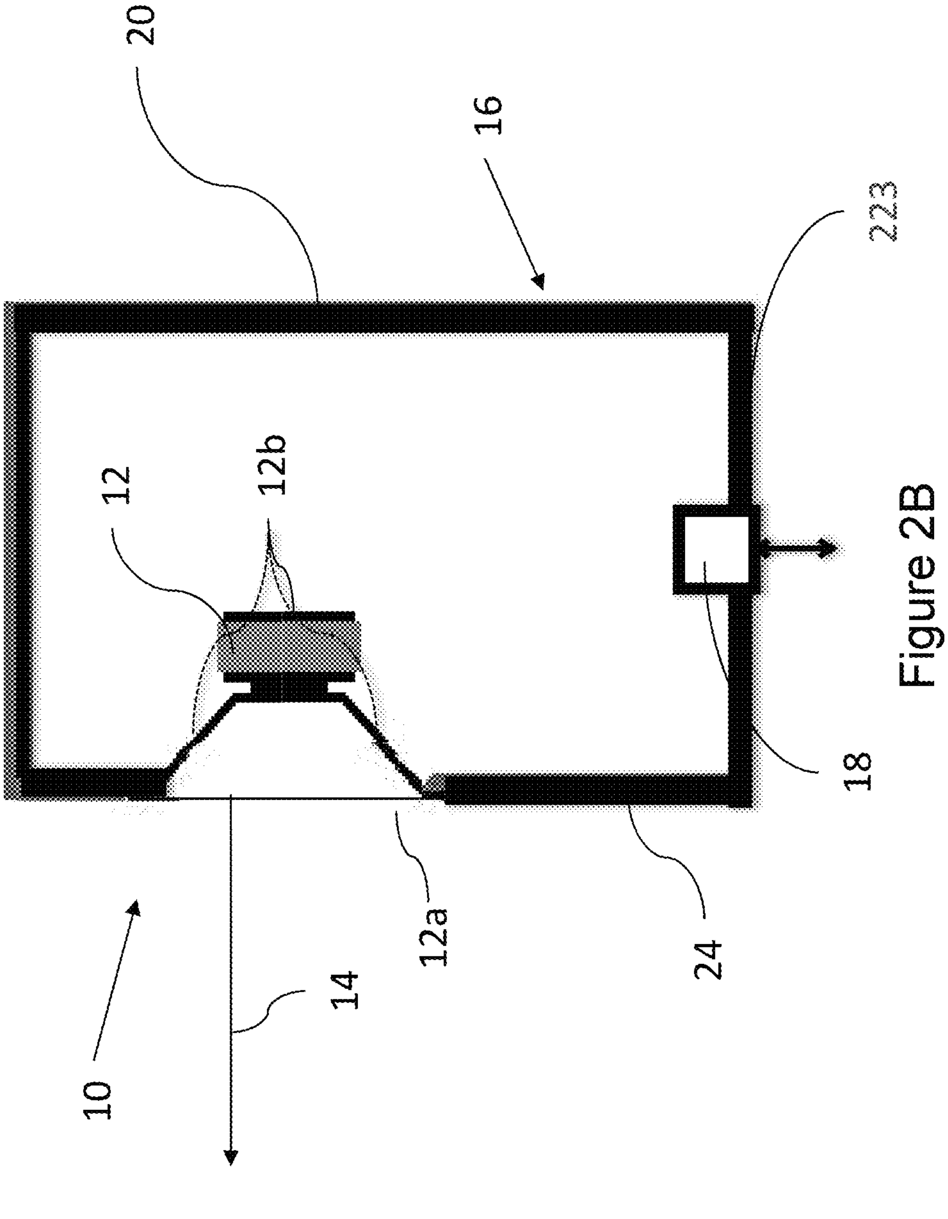
FIG. 2B is a second schematic sectional illustrations of an acoustic metamaterial ported enclosure according to embodiments of the disclosed technology.

Turning to FIGS. 2A and 2B, it is seen that an acoustics management system 10 according to the disclosed technology includes a primary loudspeaker 12 having a front side 12*a* and a back side 12*b*, the front side 12*a* facing in a first direction indicated by arrow 14. Primary loudspeaker 12 is disposed within an enclosure 16, which enclosure is substantially open in front of the speaker (in direction 14) and is closed at the sides and back (in a direction opposed to direction 14) of primary loudspeaker 12.

An AMM band-gap-tube 18 is disposed within a wall of enclosure 16, forming a port in the enclosure. In the embodiment of FIG. 2A, band-gap-tube 16 is disposed within back wall 20 of enclosure 16, the back wall being distal to loudspeaker 12. In the embodiment of FIG. 2B, band-gap-tube 18 is disposed within a side wall 223 of enclosure 16, the side wall being at a 90-degree angle to a surface 24 of the enclosure open to the front side of loudspeaker 12.

Band-gap-tube 18 is adapted to form a port in enclosure 16, to enable output of waveforms from back side 12*b* of loudspeaker 12 in, or toward, direction 14, thereby to augment at least some of the sound waveforms emanating from front side 12*a* of loudspeaker 12. As explained in further detail hereinbelow, the length and diameter of band-gap-tube 18 are calibrated based on the band-gap frequency of enclosure 16.

In some embodiments, waveforms emanating from front side 12*a* of loudspeaker 12, and the waveforms emanating from band-gap-tube 18, are both sound waveforms. In some embodiments, waveforms emanating from front side 12*a* of loudspeaker 12, and the waveforms emanating from band-gap-tube 18, are both pressure waveforms.

In some embodiments, enclosure 16 together with band-gap-tube 18 are adapted to form a Helmholtz resonator, adapted to reverse the phase of at least one waveform emanating from back side 12*b* of loudspeaker 12.

Figure 1B:
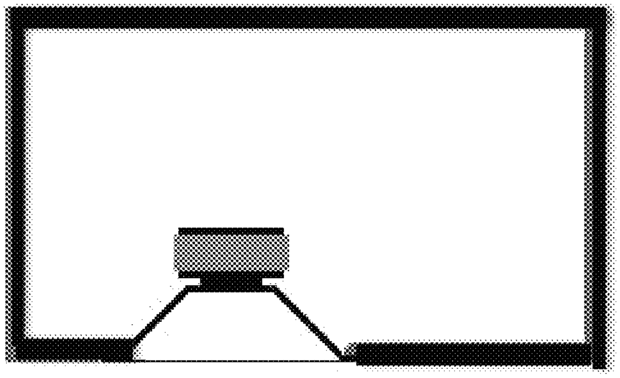
Figure 1B (Prior Art)
FIG. 1B is a second graphic representations of embodiments prior art loudspeakers.
Figure 1C:
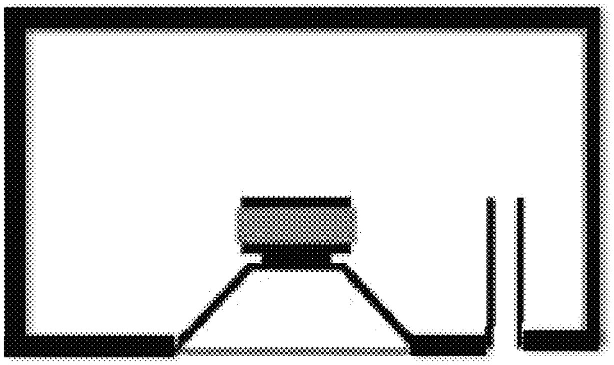
Figure 1C (Prior Art)
FIG. 1C is a third graphic representations of embodiments prior art loudspeakers.
Figure 3:
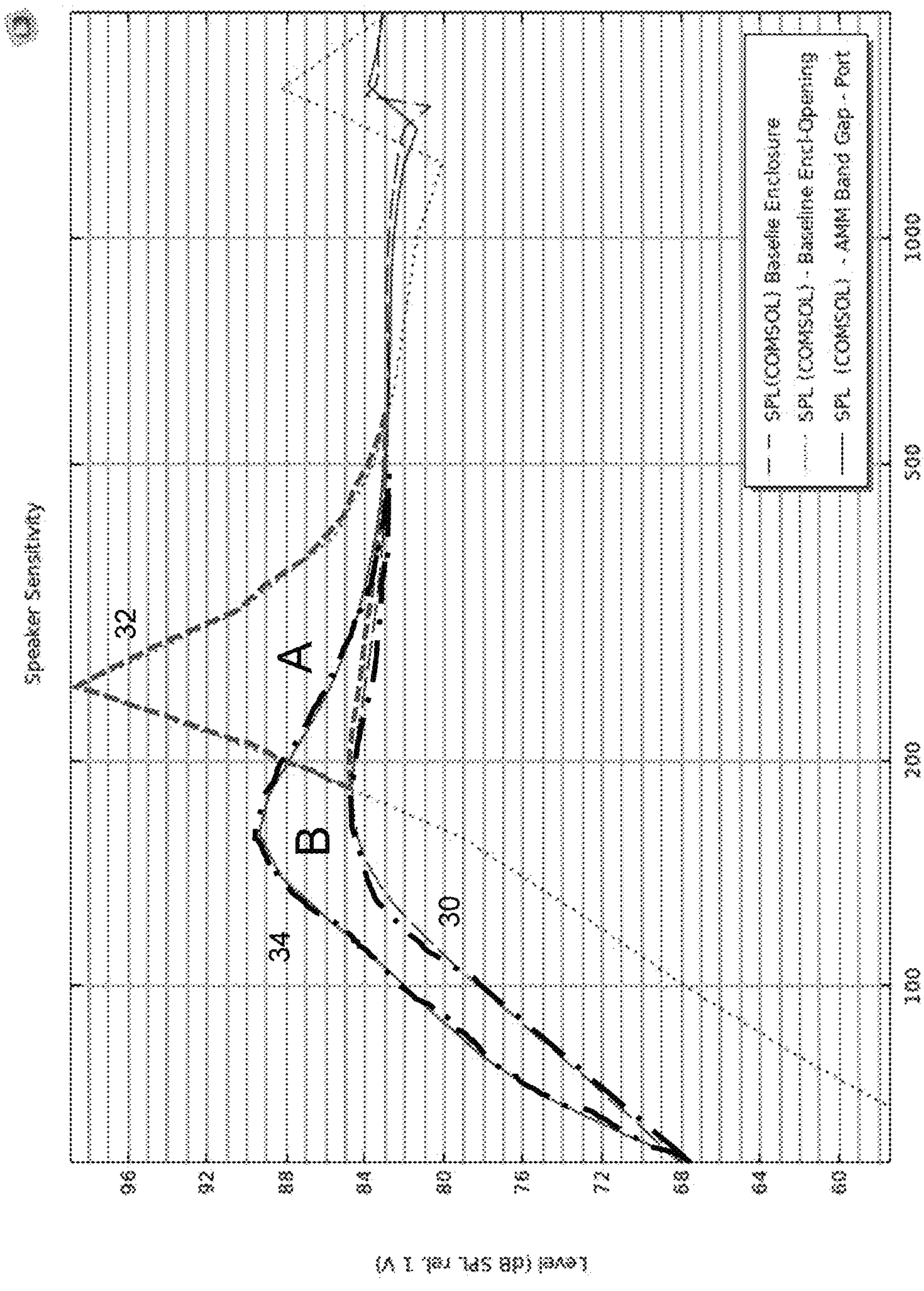
FIG. 3 is a graphical representation of numerical modeling results for an acoustic metamaterial ported enclosure according to an embodiment of the disclosed technology.

FIG. 3 includes a graph comparing the speaker sensitivity at different frequencies. Dashed line 30 illustrates the speaker sensitivity of an enclosed loudspeaker, for example as shown in FIG. 1B (PRIOR ART). Dotted line 32 illustrates the speaker sensitivity of a ported enclosed loudspeaker, for example as shown in FIG. 1C (PRIOR ART). The ported enclosed loudspeaker whose speaker sensitivity is illustrated by dotted line 32 typically has the same enclosure dimensions as the enclosed loudspeaker whose speaker sensitivity is illustrated by dotted line 30.

As seen, at low frequencies, dashed line 30 has a certain level, that gradually increases to a peak of approximately 84 dB at a frequency around 180 Hz. The speaker level remains fairly stable, which is slow and mild decline, until a frequency of approximately 125 Hz, where the speaker level drops sharply and immediately increases sharply, forming a downward spike.

In dotted line 32, the sensitivity level at low frequencies has been sacrificed in order to reach a much higher sensitivity level at a specific peak frequency, here shown as approximately 250-300 Hz. As seen, the sensitivity of the ported speaker represented by dotted line 32 to frequencies below approximately 180 Hz is significantly lower than that of the enclosed speaker represented by dashed line 30. At frequencies between approximately 180 Hz and 550 Hz, the sensitivity of the speaker represented by dotted line 32 increases and decreases to form a sharp peak at approximately 250-300 Hz, and is much higher than the sensitivity of the speaker represented by dashed line 30. As such, it can be said that the speaker represented by dotted line 32 is optimized for improved sound at frequencies between 200 Hz and 500 Hz, while allowing the sound at other frequencies to be degraded, relative to the speaker represented by dashed line 30. Stated differently, the speaker associated with dotted line 32 boosts the sensitivity at specific frequencies (200-500 Hz, with a peak at 250-300 Hz) while sacrificing the sensitivity at other frequencies.

Solid line 34 represents a speaker including an AMM band-gap tube, constructed and calibrated in accordance with the disclosed technology. As seen, the speaker represented by solid line 34 has a higher sensitivity than the speaker represented by dashed line 30 at most frequencies lower than 500 Hz. At frequencies higher than 500 Hz, the solid line 34 is substantially coincidental with dashed line 30. It is to be appreciated that the speaker represented by solid line 34 has substantially the same enclosure dimensions as the speakers represented by dashed line 30 and by dotted line 32.

In some embodiments, an area A enclosed between dotted line 32 and dashed line 30, in regions at which the dotted line is higher (more sensitive) than the dashed line, is substantially equal to an area B enclosed between solid line 34 and dashed line 30, in regions at which the solid line is higher (more sensitive) than the dashed line. As such, use of a band-gap tube in accordance with the disclosed technology can be said to redistribute the energy resulting from the porting action, in order to enable improved sensitivity of the speaker over a wider range of frequencies, including low (bass) frequencies.

It is to be appreciated that, if one were to try to achieve the increased sensitivity level of solid line 34 using prior art methods, particularly with respect to the lower frequencies (below 100 Hz), one would have to significantly increase the size of enclosure housing the speaker. In accordance with the disclosed technology, proper calibration of the band-gap tube as explained hereinbelow, enables increased sensitivity levels at low frequencies, while retaining the size of the enclosure.

Figure 4:
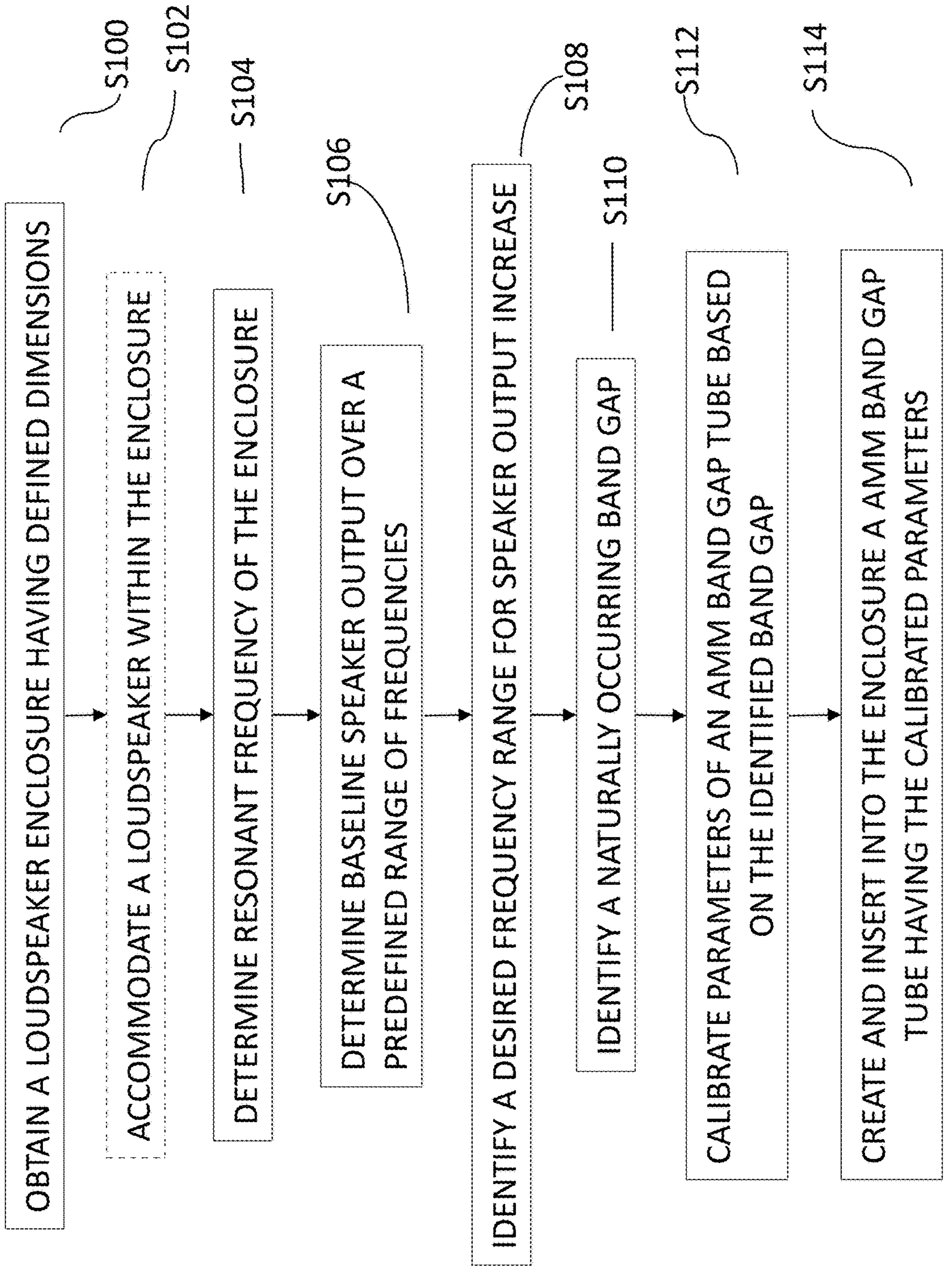
FIG. 4 is a flow chart of a method of calibrating a loudspeaker enclosure according to embodiments of the disclosed technology.

Reference is now made to FIG. 4, which is a flow chart of a method of calibrating a loudspeaker enclosure according to embodiments of the disclosed technology. The method of FIG. 4 can also be seen as a method of retrofitting an existing enclosed speaker to improve its sensitivity at lower frequencies, for example at frequencies below 100 Hz.

As seen, at step S100, a speaker enclosure having defined dimensions is obtained. The speaker enclosure may already have a loudspeaker disposed therein, or may be an enclosure suitable for accommodating a loudspeaker. In embodiments in which no loudspeaker is disposed in the enclosure, at an optional step S102 a speaker is accommodated within the enclosure to form an enclosed speaker.

At step S104, the resonant frequency of the enclosure is determined. At step S106, the baseline speaker output is determined for a predefined range of frequencies. For example, the baseline speaker output may be determined for frequencies in the range of 0 Hz to 1000 Hz.

At step S108, a desired frequency range at which it is desirable to increase the baseline output is identified. Additionally, at step S110 a naturally occurring frequency range at which no wave propagation exists in the enclosure, or a band gap, as defined hereinabove, is found for the enclosure. Typically, the band gap exists below the resonant frequency of the enclosure.

At step S112, parameters of an AMM band-gap tube for the enclosure are calibrated, based on the known band gap frequency, to improve the speaker output within the desired frequency range. For example, the frequencies affected by the band-gap tube may be calibrated or adjusted based on the exact placement of the band-gap tube within the enclosure, the diameter of the band-gap tube, and/or the length of the band-gap tube. For example, a smaller diameter of the band-gap tube may impact lower frequency ranges, and result in a smaller range of frequencies affected. In some embodiments, software components, artificial intelligence engines, and/or numerical modeling techniques may assist in determining the parameters of the AMM band-gap tube.

At step S114, an AMM band gap tube having the parameters determined at step S112 is created and inserted into the enclosure thereby to form an AMM port in the enclosure, as shown in FIGS. 2A and 2B hereinabove.

It is to be appreciated that porting of an enclosure using an AMM band-gap tube in accordance with the disclosed technology utilizes an AMM sub-resonant phenomenon based on local band gaps which spans a larger bandwidth than the bandwidth covered in prior art ported enclosures.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. An acoustics management system, comprising:
- a loudspeaker having a front side and a back side connected by side walls, said front side facing in a first direction;
- an enclosure surrounding a portion of said loudspeaker, such that said enclosure is open about said front side of said loudspeaker and is closed about said side walls and said back side of said loudspeaker; and
- an acoustic meta material (AMM) band-gap tube, disposed within a back wall or a side wall of the enclosure and forming a port therein, the AMM band-gap tube enables output of waveforms from the back side of the loudspeaker out of the enclosure, thereby to augment at least some waveforms emanating from the front side of the loudspeaker,
- wherein a length, a diameter, and a position of the AMM band-gap tube are calibrated based on a band-gap frequency of the enclosure.

2. The acoustic management system of claim 1, wherein the waveforms output from the backside of the loudspeaker and the waveforms emanating from the front side of the loudspeaker are sound waveforms.

3. The acoustic management system of claim 1, wherein the waveforms output from the backside of the loudspeaker and the waveforms emanating from the front side of the loudspeaker are pressure waveforms.

4. The acoustic management system of claim 1, wherein the AMM band-gap tube is disposed in the back wall of the enclosure.

5. The acoustic management system of claim 1, wherein the AMM band-gap tube is disposed in the side wall of the enclosure.

6. The acoustic management system of claim 1, wherein a length of the AMM band-gap tube is greater than a diameter thereof.

7. The acoustic management system of claim 1, wherein a diameter of the AMM band-gap tube is greater than a length thereof.

8. A method for calibrating a frequency range of a loudspeaker disposed within an enclosure having predefined dimensions, the method comprising:

a. identifying a resonant frequency of the enclosure;

b. identifying a baseline speaker output within a predefined range of frequencies;

c. defining a desired frequency range, within the predefined range of frequencies, within which it is desired to increase the speaker output;

d. identifying a naturally occurring band gap frequency range for the enclosure;

e. calibrating parameters of an acoustic meta material (AMM) band-gap tube, to be inserted into the enclosure for porting thereof, to improve speaker output in the desired frequency range, the parameters being calibrated based on the identified band gap frequency range; and f. porting the enclosure using the AMM band-gap tube in accordance with the calibrated parameters, thereby to increase the speaker output within the desired frequency range.

9. The method of claim 8, wherein the desired frequency range is below the resonance frequency of the enclosure.

10. The method of claim 8, wherein porting of the enclosure is configured to increase the speaker output within the desired frequency range without changing the dimensions of the enclosure.

11. The method of claim 8, wherein the identifying of the natural band gap frequency comprises searching for the natural band gap frequency at frequencies lower than the resonance frequency.

12. The method of claim 8, wherein the calibrating of the parameters comprises calibrating a designated location of the AMM band gap tube within the enclosure.

13. The method of claim 8, wherein the calibrating of the parameters comprises calibrating a length of the AMM band-gap tube.

14. The method of claim 8, wherein the calibrating of the parameters comprises calibrating a diameter of the AMM band-gap tube.

* * * * *